Figure 1:
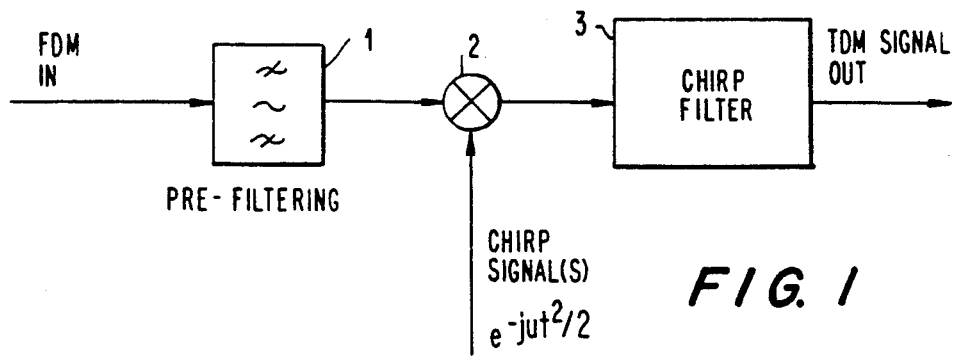
Figure 1A:
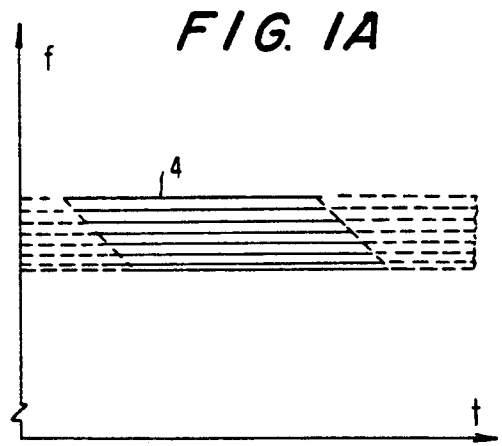
Figure 1B:
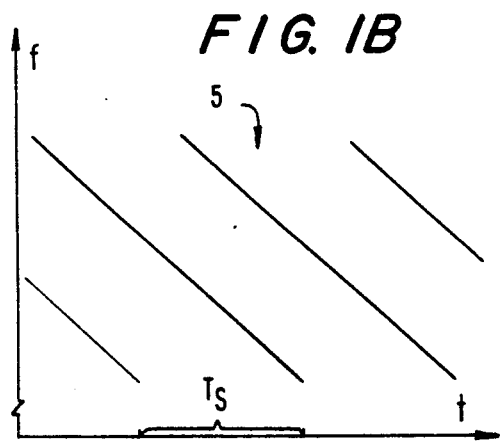
Figure 1C:
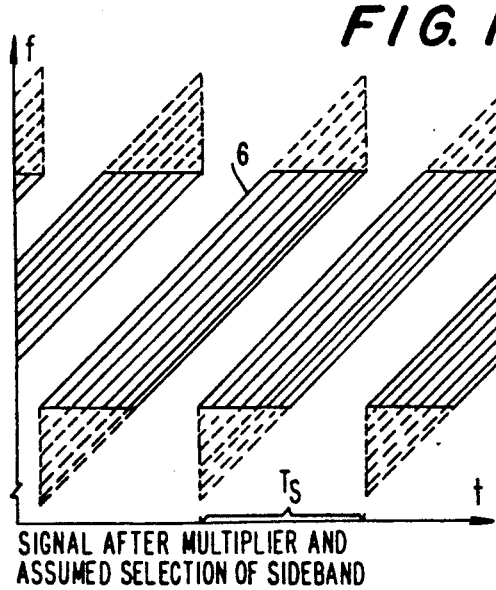

United States Patent [19]

Ronnekleiv

[11] Patent Number: 5,226,038
[45] Date of Patent: Jul. 6, 1993

[54] METHOD FOR CONVERTING AND METHOD FOR PROCESSING ELECTRONIC MULTIPLEX SIGNALS, AND APPARATUS FOR PROCESSING SUCH SIGNALS

[75] Inventor: Arne Rønnekleiv, Trondheim, Norway

[73] Assignee: Frobe Radio A/S, Trondheim, Norway

[21] Appl. No.: 678,969

[22] PCT Filed: Nov. 6, 1989

[86] PCT No.: PCT/NO89/00115
§ 371 Date: Apr. 24, 1991
§ 102(e) Date: Apr. 24, 1991

[87] PCT Pub. No.: WO90/05417
PCT Pub. Date: May 17, 1990

[30] Foreign Application Priority Data

Nov. 7, 1988 [NO] Norway .................. 884965

[51] Int. Cl.⁵ .............................. H04J 4/00
[52] U.S. Cl. ................... 370/49.5; 370/123; 370/50
[58] Field of Search .......... 370/50, 70, 123, 49.5

[56] References Cited

U.S. PATENT DOCUMENTS

| | | | |
|---|---|---|---|
| 4,237,551 | 12/1980 | Narasimha | 370/50 |
| 4,578,790 | 3/1986 | Molo et al. | 370/70 |
| 4,754,449 | 6/1988 | Crookshanks | 370/70 |
| 4,901,310 | 2/1990 | Ichiyoshi | 370/70 |
| 5,038,344 | 8/1991 | Kawamura | 370/50 |

*Primary Examiner*—Douglas W. Olms
*Assistant Examiner*—Min Jung
*Attorney, Agent, or Firm*—Cohen, Pontani, Lieberman, Pavane

[57] ABSTRACT

A method and apparatus for converting electronic signals from frequency-division multiplex format into time-division multiplex format while retaining substantially all phase and amplitude information of a band-limited continuous signal. A continuous frequency-division multiplex format signal is multiplied with a first chirp signal having a periodic sequence with period T, a constant amplitude and a phase variation having a non-zero constant amplitude second derivative of said phase variation with respect to time $\mu$. A convolution is then performed of said multiplied signal with a convolution filter having an impulse response defined by $$h_0(t) \times e^{j(\omega_0 t - \mu t^2/2)}$$

wherein $h_0(t)$ is a function having finite delay greater than T, and $\omega_0$ is a constant.

2 Claims, 3 Drawing Sheets

FDM SIGNAL IN PROCESSING WINDOW INDICATED

CHIRP SIGNALS, ONE SIGNAL PER SET OF SAMPLES,

SIGNAL AFTER MULTIPLIER AND ASSUMED SELECTION OF SIDEBAND

TDM SIGNAL OUT

SIGNAL AFTER
CHIRP FILTER

CHIRP SIGNALS, ONE
SIGNAL PER SET SAMPLES

SIGNAL AFTER MULTIPLICATION
WITH CHIRP SIGNALS AND
SELECTION OF (ASSUMED) SIDEBAND

SIGNAL AFTER FILTER 13, FROM
ONE TDM WINDOW,

METHOD FOR CONVERTING AND METHOD FOR PROCESSING ELECTRONIC MULTIPLEX SIGNALS, AND APPARATUS FOR PROCESSING SUCH SIGNALS

This invention relates to a method for converting and a method for processing electronic multiplex signals, and an apparatus for processing such signals. Thus, on the one hand the invention relates to filtering of electronic signals combined with conversion from frequency-division multiplexing (FDM) of the signals to time-division multiplexing (TDM) of the signals, whereby many filter functions must be performed in parallel in order to separate the signals from each other. On the other hand, the invention is concerned with filtering of signals combined with conversion from time-division multiplexing of the signals into frequency-division multiplexing of the signals, whereby many filter functions must be performed in parallel in order to avoid frequency overlap of the signals in an undesired manner. In this connection the invention can be considered to relate to a combined electronic filter bank.

The invention also comprises a combination of conversion from FDM to TDM and subsequent conversion from TDM back to FDM, both taking place in one or more units having intermediate analogue and/or digital signal processing. This makes possible bandpass filtering of the signals with great flexibility in the choice of center frequency and bandwidth for implementing filter functions, and with a low processing requirement, power consumption and space requirement compared to other, known solutions based on present-day technology.

Conversion between FDM and TDM formats is today known by filtering and sampling, respectively, modulation of sample sequences, for each individual signal, and combination of sample sequences or signals to TDM or FDM formats. This results in large circuit arrangements with a high volume and power consumption. Moreover, so-called transmultiplexer techniques are known [1, 2] (See list of references at the end of this description). These are to a large extent based on digital processing for carrying out the filter functions and require a relatively high processing capacity.

Further, techniques are known based on the analogue-chirp-Z Fourier transform [3, 4], in which a Fourier transform of an analogue signal sequence is performed either by the steps of multiplication (M), convolution (C) and finally multiplication (M) with so-called chirp signals (FM sweep signals), i.e. an MCM transform; or by the steps of convolution, multiplication and convolution with such signals, i.e. a CMC transform.

From the patent literature reference can be made to European patent publication No. 214,649 which relates to conversion from FDM to TDM by complete Fourier transform, and therefore is encompassed within the field of known techniques mentioned above. Of greater interest is U.S. Pat. No. 4,578,790 which describes a system having in principle a structure somewhat related to that to which the present invention is directed. That U.S. patent, however, is specialized in the direction of single sideband multiplexing and purely digital filtering processes. It utilizes the digital technique in order to obtain simplification and does not at all discuss analogue processing in order to perform the individual functions in the transform.

The invention may be regarded to be most closely related to the above mentioned CMC transform, but is distinguished therefrom in that for the FDM-to-TDM case the first convolution (filtering) is omitted while at the same time the response of the filter employed for the last convolution is somewhat modified, but without substantially changing the complexity of the filter. In the TDM-to-FDM case the last filter is omitted and the first filter is modified.

More directed statements of the invention as of well as the novel and specific features thereof are found in the claims, of which claims 1 and 2 are respectively related to each of the two cases just mentioned.

The change in the frequency response of the corresponding chirp filters from the MCM circuits to the circuits proposed here, can in both cases be described as follows, in which it is assumed that a filtering of the signals is desired which corresponds to an impulse response $h_0(t)$ in the baseband of the filter. For the CMC transforms the filter on that side where the time samples are outputted and fed in, respectively, then have a frequency response given by $$h_0\left(\frac{\omega_0 - \omega}{\mu}\right) \cdot \exp\left[j\frac{(\omega - \omega_0)^2}{2\mu}\right],$$

in which the exponential function represents an "ideal" chirp in the frequency domain. In the time domain an "ideal" chirp is a frequency sweep signal having a frequency varying linearly with time and having a constant amplitude, $\exp[j(\omega_0 t - \mu t^2/2)]$. Here $\omega_0$ and $\mu$ are constants; $\mu$ may be positive or negative, but not zero, and determines the frequency change per time unit (rad/s$^2$) for the ideal chirp. According to a particular feature of the invention the ideal filter is here defined as having an impulse response equal to $h_0(t)^* \exp[j(\omega_0 t - \mu t^2/2)]$. In systems with few signals it will be particularly useful to employ a filter response as stated here. The periodicity of the chirp signals gives the sampling rate for the individual signal.

The advantage obtained with the present invention in relation to the circuits based on the Fourier transform is that it is sufficient to carry out only two chirp operations, i.e. a convolution (C) and a multiplication (M), as compared to three operations, i.e. CMC or MCM with a full Fourier transform. This means that the invention results in a reduced volume, complexity and power consumption, especially in narrowband systems in which the chirp filters will be physically large. Note that for the MCM transform the chirp filter has an impulse response length closely corresponding to the sum of the response lengths of the two filters in the CMC structure for the same capacity.

Figure 2:
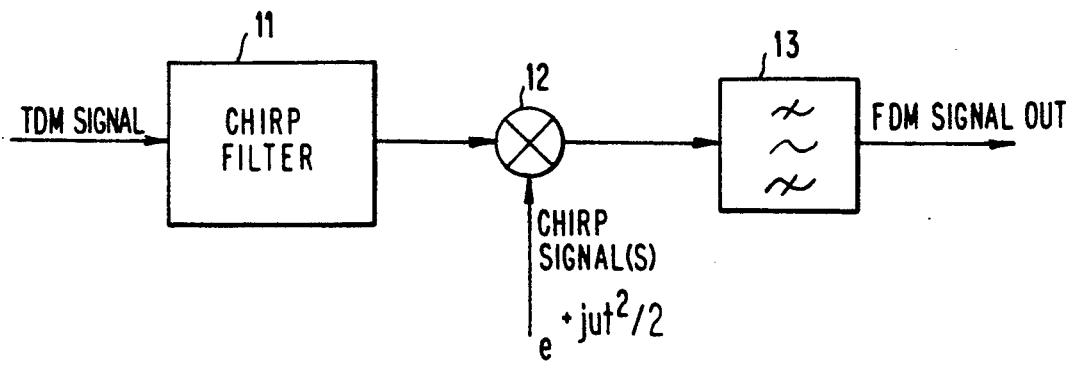
Figure 3:
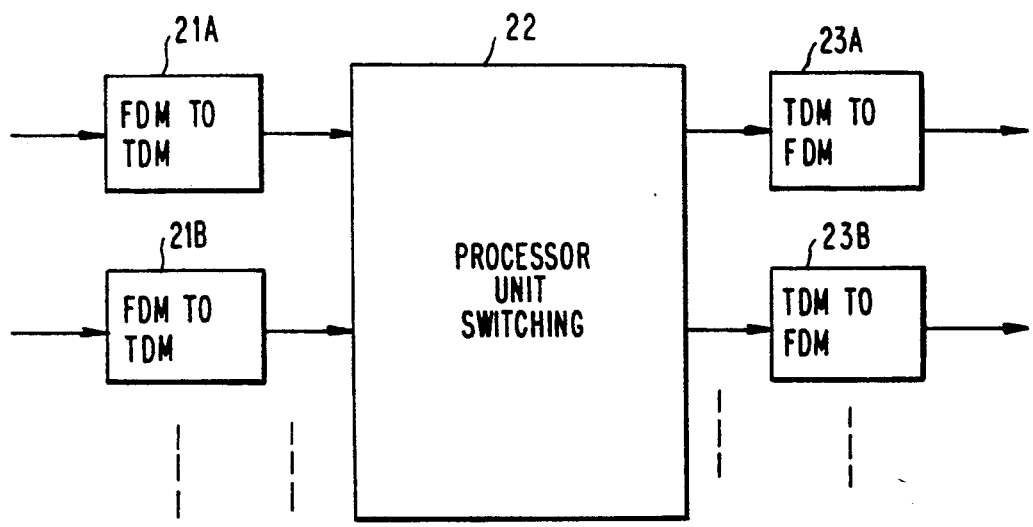
Figure 2A:
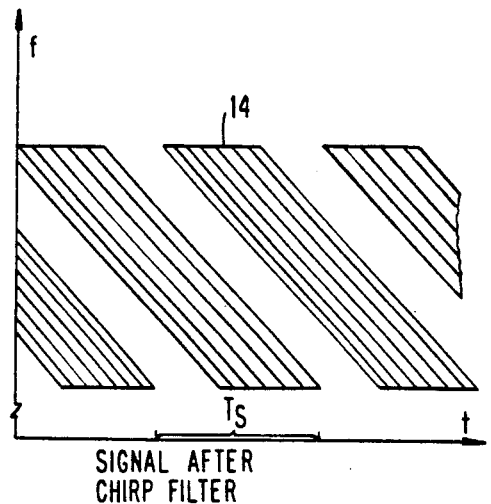
Figure 2B:
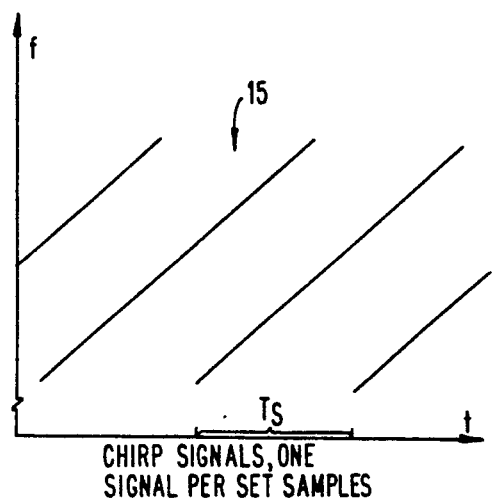
Figure 2C:
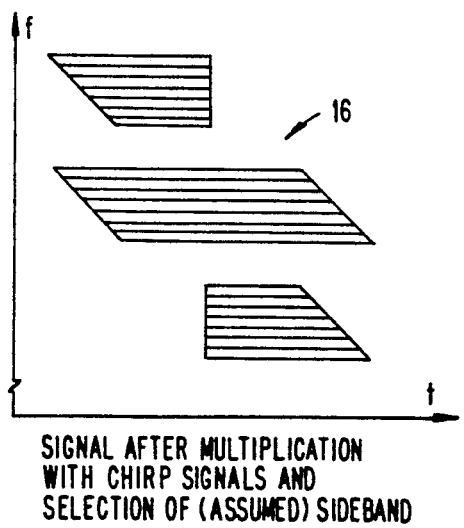
Figure 2D:
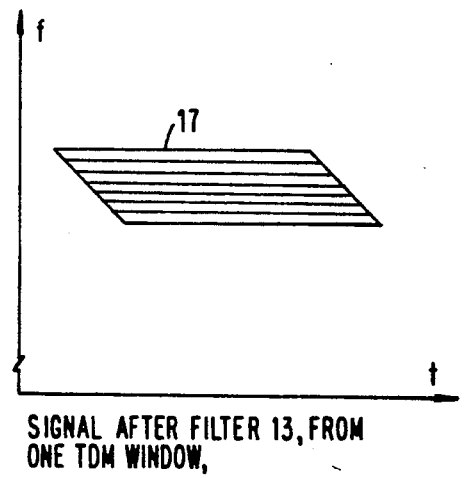

The present invention, together with additional particular features and advantages thereof, shall be explained more closely in the following description with reference to the drawings, in which:

FIG. 1 schematically and in principle shows a first example of a circuit for conversion from FDM to TDM formats in occordance with the invention;

FIGS. 1A–1D show successive signal forms during conversion using the circuit of FIG. 1;

FIG. 2 schematically and in principle shows another example of a circuit for signal conversion, namely from TDM to FDM format, in accordance with the invention;

FIGS. 2A–2D show successive signal forms during conversion using the circuit of FIG. 2; and FIG. 3 shows in principle an apparatus in accordance with the invention for processing electronic signals by conversion as in FIG. 1 and FIG. 2.

EXAMPLE 1

FDM-to-TDM conversion

FIG. 1 schematically depicts a circuit for FDM-to-TDM conversion in accordance with the present invention. The input signal first passes through a prefiltering filter ("cover-filter") 1 which removes noise and signals outside the band to be processed. It is then multiplied with one or, preferably, several parallel running chirp signals in one or more multipliers 2 before it is filtered in a chirp filter 3. The chirp rate of the chirp signals has an absolute value equal to the chirp rate of the ideal chirp signal which modulates the impulse response of the chirp filter, for an ideal operation. The sign of the chirp rates of the chirp and the filter, as well as the signal frequencies and the sideband after the multiplication, are so chosen that an input pure tone is outputted as a band-limited pulse.

FIGS. 1A–1D show the signals in the circuit of FIG. 1 in time-frequency diagrams. The input FDM signal is denoted 4. The signal components in time and frequency which influence the output TDM signal within a time slot, i.e. the processing window, are indicated (for a given choice of chirp rate and frequencies). The chirp signals are shown at 5, and at 6 the signal after multiplication and an assumed selection of one sideband the selection taking place in the chirp filter. The output TDM signal is shown at 7, i.e. a pulse for each input signal. It is presumed here that both in the chirp signals and in the impulse response of the chirp filter 3 the frequency decreases with time, that the signal has a higher center frequency than the chirp signals and that the lower sideband is selected after multiplication. This means that the pulses corresponding to the signals having the highest frequency are first outputted. Other combinations of chirp rate and center frequencies can give the same result—or alternatively the highest frequency signal pulse outputted last.

A similar circuit for TDM-to-FDM conversion is schematically shown in FIG. 2, comprising a chirp filter 11, a multiplicator 12 and a bandpass filter 13.

Figure 1D:
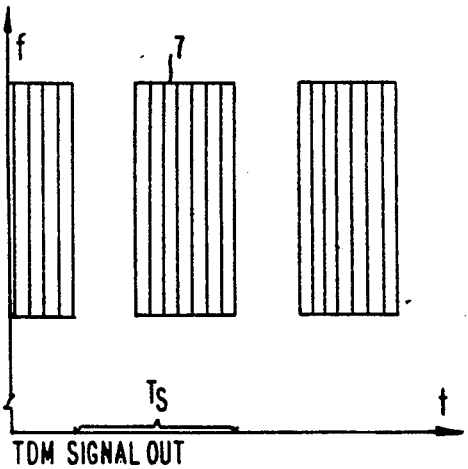

In principle the TDM signal can be as shown at 7 in FIG. 1D. After passage through the chirp filter 11, which is considered to have an increasing time delay with decreasing frequency, the signal will appear as shown at 14 in FIG. 2A. The signal is then multiplied by a series of periodic chirp signals, shown at 15 in FIG. 2B, having an increasing frequency versus time and the same chirp rate (in absolute value) as the filter. At 16 (FIG. 2C), the signal is shown after multiplication of the signal in one TDM window with the set of chirp signals and selection of the desired sideband (assumed). Here it is presumed that the chirp signals have a higher center frequency than the signals 14, and that the lower sideband is chosen after multiplication. The same signal is shown at 17 after filtering in the filter 13 in FIG. 2.

It is assumed here that the filter function implemented by the CM circuit is adapted to the sampling rates of the TDM signal so that repeated sidebands in the (re)constructed FDM signal are sufficiently suppressed in accordance with design requirements and known theory. It is also assumed that the samples of the TDM signal are phase shifted so that they will have the center frequency at which they shall be generated. This is trivial if the frequency is equal to an integer $\times 1/T_s$ in which $T_s$ is the time separation between the samples for each signal.

Based on conversion as in Examples 1 and 2 discussed above, there is now described a method and apparatus for signal processing in accordance with the invention as illustrated in principle by FIG. 3.

Units which can perform FDM-to-TDM and TDM-to-FDM conversion can be combined via an intermediate processor unit which can be an analogue and/or a digital unit, and which performs such operations as are appropriate as a formation of the desired total processing. Units 21A, 21B . . . in FIG. 3 are FDM-to-TDM units, as in FIG. 1, having the same sampling rate. Reference numeral 22 denotes the processor unit and 23A, 23B . . . are TDM-to-FDM units adapted to the sampling rate for the units 21A, 21B . . . and so forth.

If the FDM signals are individually completely characterized in accordance with known sampling theory, each by its series of samples in the TDM signal, with one sample per signal per TDM time slot, the processing and control of the signal operations of the processing unit 22 in FIG. 3 can take place as follows:

If necessary, desired TDM sequences are filtered further filtered so that possible undesired signal components belonging to neighbouring FDM signals are removed. This will require intermediate storing of a number of TDM frames depending on the length of the digital filter.

TDM samples which have been processed can then be routed from a random unit 21A–21B and so forth to a random unit 23A–23B, and be put into a random unoccupied time slot in the TDM signal here, by using known switching techniques. In this way a given arriving FDM signal at a random input unit 21A, 21B . . . can be reconstructed at a random frequency in a random input unit. The system performs a selection of FDM signals, switching and frequency translation of the signals with a random complicated complex pattern determined by the processor unit 22. The switching can take place in a control unit which forms a part of the processor unit.

With the MC and CM circuits shown in FIGS. 1 and 2, the spectra of each individual signal will be inverted from the input to the output. This can be avoided by complex conjugation of the FDM samples in the processor units 22 (or by modifying the FDM-to-TDM circuits 21A, 21B or the TDM-to-FDM circuits 23A, 23B.

If a single TDM signal does not characterize an individual FDM signal (because it has too large a bandwidth or the wrong frequency) continued filtering, sampling and switching and reconstruction of signals within a flexible chosen band is possible. However, the processing must be somewhat modified in order to obtain a correct phase relationship at the output between signals from adjacent TDM frames. A possible modification is to let the processor unit 22, in addition to optional filtering and switching of the signals, perform complex conjugation thereof before reconstruction. This may be verified by known theory. Modifications of the FDM-to-TDM circuits 21A, 21B or the TDM-to-FDM circuits 23A, 23B offer further possibilities.

Selection (filtering-out) of a band from an input unit 21A, 21B, routing to a chosen output unit 23A, 23B and optional frequency translation of the band now takes place by having a corresponding group or TDM samples processed and conveyed in parallel to the desired output unit while maintaining their order, and possibly being complex conjugated and reconstructed therein. If any frequency translation in the unit is restricted to steps of an integer$\times 1/T_s$, this is sufficient. If smaller steps are desired, the samples must be displaced in frequency as by the usual frequency translation before reconstruction included complex conjugation. Filtering in the processor unit 22 may now be necessary in order to obtain a sufficiently flat frequency response within the bands transferred, and it can be utilized to sharpen band edges with insignificant extra processing (since only signals at the band edges need be processed). This results in a significant increase in the intermediate storage of data, since TDM samples for all desired signals must be buffered in order to compensate for the time delay in the filters, assuming filtering with a linear phase. Both aspects can be analyzed by means of known theory.

By having the TDM samples corresponding to certain output frequency bands multiplied by a variable in the processor unit, information can be modulated into signals in those frequency bands. The information may be made different in the various frequency bands by letting the variable multiplier be different with respect to the corresponding TDM samples. The frequency selectivity by modulation will correspond to what is obtained by filtering in such a configuration. The modulation must be slow so that it will result in a small degree of band broadening of the signals, in order to avoid substantial removal or changing thereof by the filtering in the TDM-to-FDM conversion, and further to avoid errors arising from TDM samples in the same frame representing FDM signals having different time delays. The latter can be avoided by delaying the modulating signal correspondingly for the individual TDM samples in the same frame. Both effects can be analyzed by means of known theory.

In addition to other processing, as mentioned the TDM sample from various FDM-to-TDM units can be multiplied with different constants in the processor unit and the results added together, and this can then be used as an input signal for a TDM-to-FDM unit. In this manner a weighed filtered sum of several arriving signals can be formed. This corresponds to frequency selective beam forming in an array antenna during reception.

Frequency selective beam forming in an array antenna during transmission can be obtained in an analogue manner by multiplying samples from a FDM-to-TDM unit with different constants in a processor unit, in addition to other necessary processing as mentioned above, and using each sample as an input signal to a separate TDM-to-FDM unit together with other samples for other frequency ranges or added to samples for other beam directions at the same frequencies.

REFERENCES

1) H. Scheuerman, H. Gockler: "A comprehensive survey of digital transmultiplexing methods" Proc. IEEE, Vol 69, pp 1419-1450, Nov. 1981.
2) T. G. Marshall Jr., C. M. Puckette: "Guest Editors' Prologue, Special Issue on Transmultiplexers", IEEE trans. Communications, Vol COM-30, No. 7, Part I, pp 1457-1459, July 1982.
3) M. A. Jack, E. G. S. Paige: "Fourier Transform Processors based on Surface Acoustic Wave Filters", Wave Electronics 3, 1978 pp 229-247.
4) R. C. Williamson, V. S. Dolat, R. R. Rhodes and D. M. Boroson: "A satellite-borne SAW chirp-transform system for uplink demodulation of FSK communication signals" 1979 Ultrasonics Symposium Proceedings, pp 741-747.

I claim:

1. An apparatus for processing continuous band-limited signals in frequency-division multiplex format, comprising:

a first set of convertors, each said converter of said first set being operable for converting a separate one of a plurality of continuous frequency-division multiplex format input signals into a time-division multiplex format signal having a frame duration $T_s$, each said convertor of said first set having a multiplier for receiving a respective continuous frequency-division multiplex format input signal and a first chirp signal having a periodic sequence with period $T_s$, a constant amplitude and a first phase variation having a non-zero constant amplitude second derivative of said first phase variation with respect to time $\mu_1$ as inputs and producing a respective multiplied signal as an output, each said convertor of said first set having a first convolution means for performing a convolution of said respective multiplied signal with a second chirp signal using a first set of convolution filters each having an impulse response defined by $$h_1(t) \times e^{j(\omega_1 t - \mu_1 t^2/2)}$$

wherein $h_1(t)$ is a predetermined function having a finite delay greater than $T_s$, and $\omega_1$ is a constant, and each said converter of said first set having as an output a time-division multiplex format signal;

means for receiving and for processing said time-division multiplex format signals output from said first set of convertors, and having as an output a set of processed time-division multiplex format signals;

a second set of convertors, each said convertor of said second set being operable for converting one of the processed time-division multiplex format signals into a respective output continuous frequency-division multiplex format signal, each said convertor of said second set having a second convolution means for performing a convolution of one of said processed time-division multiplex format signals with a third chirp signal using a second set of convolution filters having an impulse response defined by $$h_2(t) \times e^{j(\omega_2 t - \mu_2 t^2/2)}$$

wherein $h_2(t)$ is a function a finite delay greater than $T_s$ and $\omega_2$ is a constant, and each said convertor of said second set having a multiplier having as inputs a respective convoluted processed time-division multiplex format signal and a fourth chirp signal having a periodic sequence with period $T_s$, a constant amplitude and a second phase variation having a non-zero constant amplitude second derivative of said second phase variation with respect to time $\mu_2$, and having as an output a respective continuous frequency-division multiplex format output signal.

2. The apparatus according to claim 1, wherein each said frequency-division multiplex format signal comprises a plurality of components which are partially overlapping, such that the corresponding time-division multiplex format signal comprises a continuous time signal within each frame.

* * * * *